United States Patent [19]
Kreis et al.

[11] Patent Number: 5,872,788
[45] Date of Patent: Feb. 16, 1999

[54] METHOD AND DEVICE FOR THE TRANSMISSION OF DATA

[75] Inventors: Jürg Kreis, Volketswil; Johannes Heusser, Adetswil, both of Switzerland

[73] Assignee: Zellweger Luwa AG, Switzerland

[21] Appl. No.: 523,804

[22] Filed: Sep. 5, 1995

[30] Foreign Application Priority Data

Sep. 8, 1994 [SE] Sweden ............................... 02 743/94

[51] Int. Cl.⁶ .................................................. H04B 3/00
[52] U.S. Cl. ...................................... 370/475; 340/825.07
[58] Field of Search ..................................... 370/432, 449, 370/475, 365, 364, 362, 389; 340/825.07, 825.52; 395/200.81, 200.83, 200.38

[56] References Cited

U.S. PATENT DOCUMENTS

| | | | |
|---|---|---|---|
| 4,855,792 | 8/1989 | Takeuchi et al. | 340/825.05 |
| 4,864,519 | 9/1989 | Appleby et al. | 364/550 |
| 5,049,872 | 9/1991 | Yamanaka et al. | 340/825.05 |
| 5,278,848 | 1/1994 | Yamaguchi | 371/49.1 |
| 5,483,230 | 1/1996 | Mueller | 340/825.06 |

FOREIGN PATENT DOCUMENTS

| | | | |
|---|---|---|---|
| 0191239 | 8/1986 | European Pat. Off. | G08B 26/00 |
| 3826 893 | 3/1989 | Germany | H04Q 9/14 |
| 2049365 | 12/1980 | United Kingdom | H04J 6/00 |

*Primary Examiner*—Benedict V. Safourek
*Assistant Examiner*—Matthew C. Phillips
*Attorney, Agent, or Firm*—Burns, Doane, Swecker & Mathis, L.L.P.

[57] ABSTRACT

A system is disclosed for the transmission of data between a central unit and at least one functional unit via lines where each functional unit is connected to at least one sensor or actuator. Each functional unit includes an output amplifier for the transmission of data to a further functional unit and a memory for the storage of an interchangeable address. The system has three different operating modes which make it possible, depending on the requirement, to address the functional units as desired, to carry out a data interchange, or only to receive data.

7 Claims, 4 Drawing Sheets

METHOD AND DEVICE FOR THE TRANSMISSION OF DATA

BACKGROUND OF THE INVENTION

The invention relates to a device and a method for the transmission of data between a central unit (master) and at least one functional unit (slave) via at least two lines, each functional unit being connected to at least one sensor or actuator.

Such a device is generally known, for example, as a bus system under the designation INTERBUS-S, and is also standardized. This bus system is designed such that it operates like a shift register. This results in the advantage that the individual subscribers need not be identified by addresses. On the other hand, the individual subscribers or the individual functional units, and thus the actuators and sensors as well, cannot be selected individually by the central unit.

Other devices of this type are known in which the addresses must be programmed in advance or which do not require any addresses at all as the data are intrinsically received selectively by the subscribers. However, such systems can be used only in specific, given circumstances.

It is therefore the object of the invention to provide a method and a device which allow the interchange of data between a central unit and individual subscribers objectively in a cost-effective manner, it being possible to reassign the selection of the subscribers repeatedly and in a simple manner.

SUMMARY OF THE INVENTION

This object is achieved in that a central unit and a functional unit or subscriber, or preferably a plurality of functional units or subscribers, can be connected in series via at least two data lines and possible further supply lines. In the bus system produced in this way, data can be passed on, as in a shift register, from one functional unit to the other. At the same time, the data are filtered after arrival in each functional unit and are amplified before leaving it. All the data are provided with addresses which are compared in the individual functional units with previously stored addresses, so that only those data which have the correct address continue to be used in a functional unit. The addresses are not preprogrammed in the individual functional units but are simply read in, which can be done whenever operation starts. A specific operating mode is provided for this purpose.

The advantages which are achieved by the solution according to the invention can be seen, in particular, in that, in this sense, data can be transmitted in a distributive manner, cost-effectively, over short and medium distances, and for the transmission of instructions to actuators or for the recovery of measurements or settings from sensors. The high efficiency of the transmission is achieved by a very compact communications protocol, as a result of which even a low transmission rate is adequate. The assignment of addresses to the individual functional units is in each case done when the system is started up and, in consequence, can be reselected easily at any time. The system can thus easily be reconfigured. As a result of this type of addressing, it is now possible to combine the actuators and sensors in groups which are in each case selected in the same way. The design according to the invention of the device in addition also makes it possible for a functional unit to call the central unit. In this way, the functional unit can request the central unit to make contact with the corresponding functional unit immediately. In addition, various priorities are possible. If the priority is the same, the position within the bus is the deciding factor on the functional unit with which data are interchanged first. This makes it possible to relieve the load on the functional units and the central unit further and prevents undesirable superimposition of data, which could occur as a result of the collision of two data packets. If the bus is designed in annular form, that is to say it is closed, it is possible in the event of a failure of a functional unit to reproduce operational readiness. However, a precondition of this is that the functional units, together with the drivers, are of identical or symmetrical design. The operational readiness is achieved by the renewed configuration of the device. Diagnosis of functional units which are operating defectively can generally be carried out very simply since faults do not affect the entire system and the faulty parts can thus be localized more easily. Every functional unit is equipped with an input filter and an amplifier, which are inserted in series into the connecting lines between the functional units. Thus, the signal which is to be transmitted is freshly conditioned again after each functional unit so that long connecting lines can be provided.

BRIEF DESCRIPTION OF THE DRAWINGS

The invention is explained in more detail in the following text, using an example and with reference to the attached figures, in which FIGS. 1 and 2 each show a schematic illustration of the design of the device.

DETAILED DESCRIPTION

Figure 1:
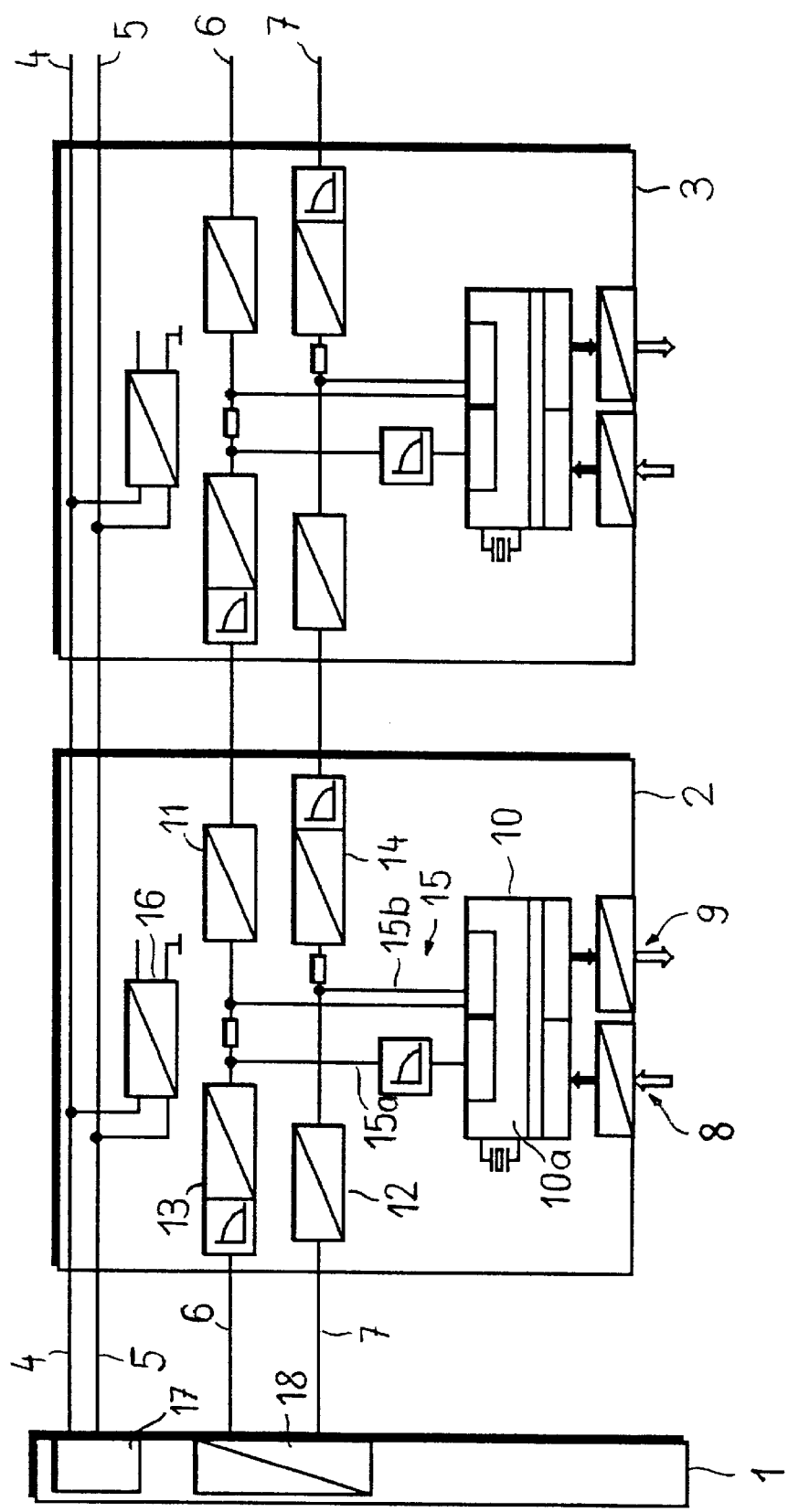

FIG. 1 shows at least part of a central unit 1 to which, for example, two functional units 2 and 3 are connected via lines 4, 5, 6 and 7.

Each functional unit 2, 3 has connections 8 and 9 for one or more sensors or for one or more actuators. The actuators and sensors are not illustrated in more detail here since they are generally known. In addition to these connections, the functional units 2, 3 have a processor 10, output amplifiers 11 and 12, input filters 13 and 14 as well as connections 15 between the processor 10 and the lines 6 and 7. Each functional unit 2, 3 thus has appropriate means for the transmission of data via further functional units to the central unit 1. In particular, the processor 10 also has a computer and memory section 10a which is used for the storage and checking of an address. In the functional unit 2, 3, an electrical power supply 16 is connected to the lines 4 and 5 which are used for supplying the functional unit, which electrical power supply 16 supplies, in a manner which is not illustrated in more detail here but is known, electrical energy to the elements mentioned above, such as the output amplifiers 11, 12, input filters 13, 14 and the processor 10.

In particular, the central unit 1 likewise has an electrical power supply 17, which is connected to the lines 4 and 5, as well as an interface 18 which is standardized and is known, for example, by the type designation RS232 or RS485. The central unit 1 is part of a computer, as is generally known by the designation "Personal Computer (PC)", or is part of a controller. The PC or the controller requires only a matching interface 18 thereto.

Figure 2:
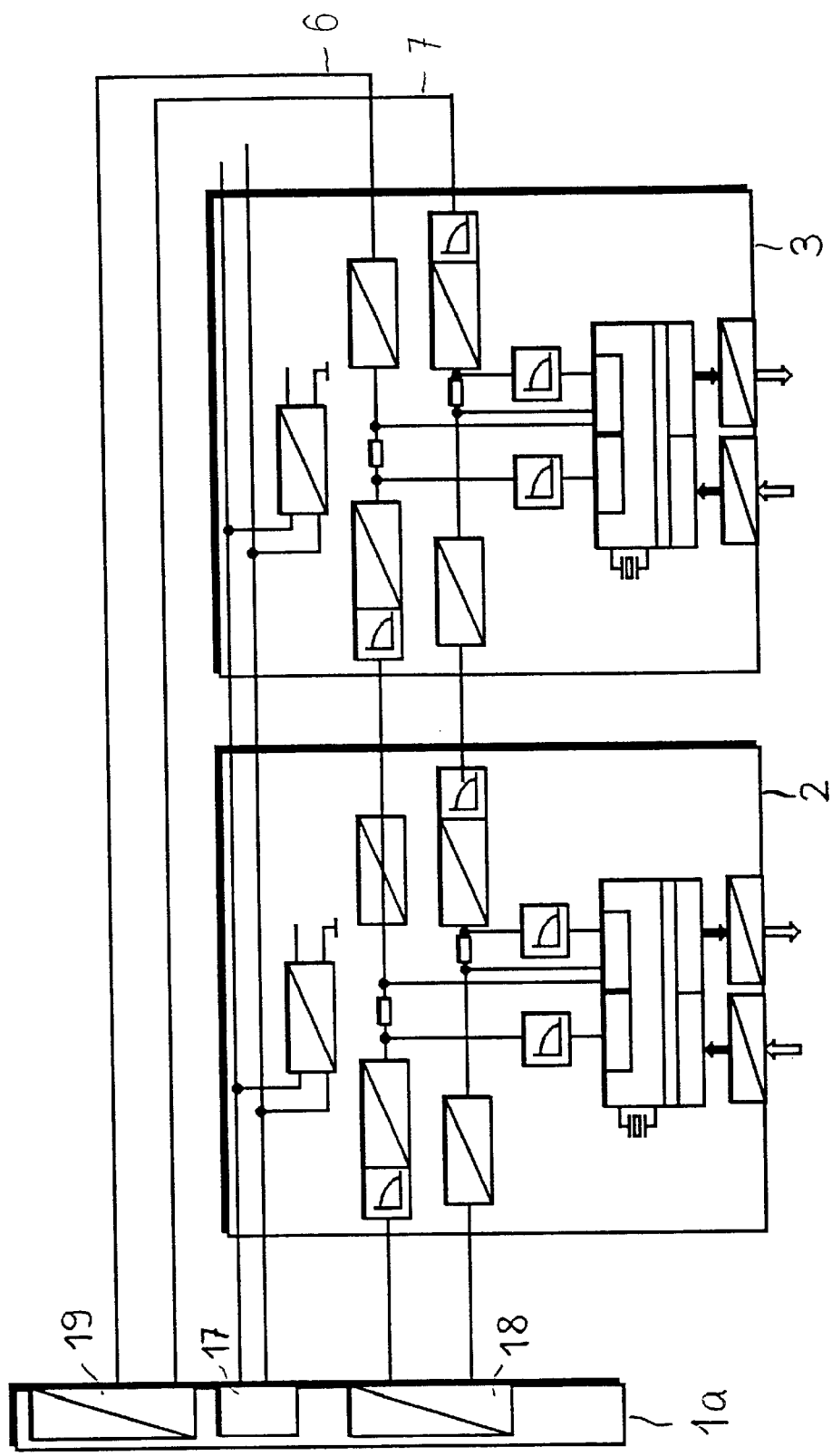

FIG. 2 shows essentially the same arrangement as in FIG. 1, but with the difference that the lines 6 and 7 are fed back to a further interface 19 in the central unit 1a. An annular, closed bus is thus formed.

Figure 3:
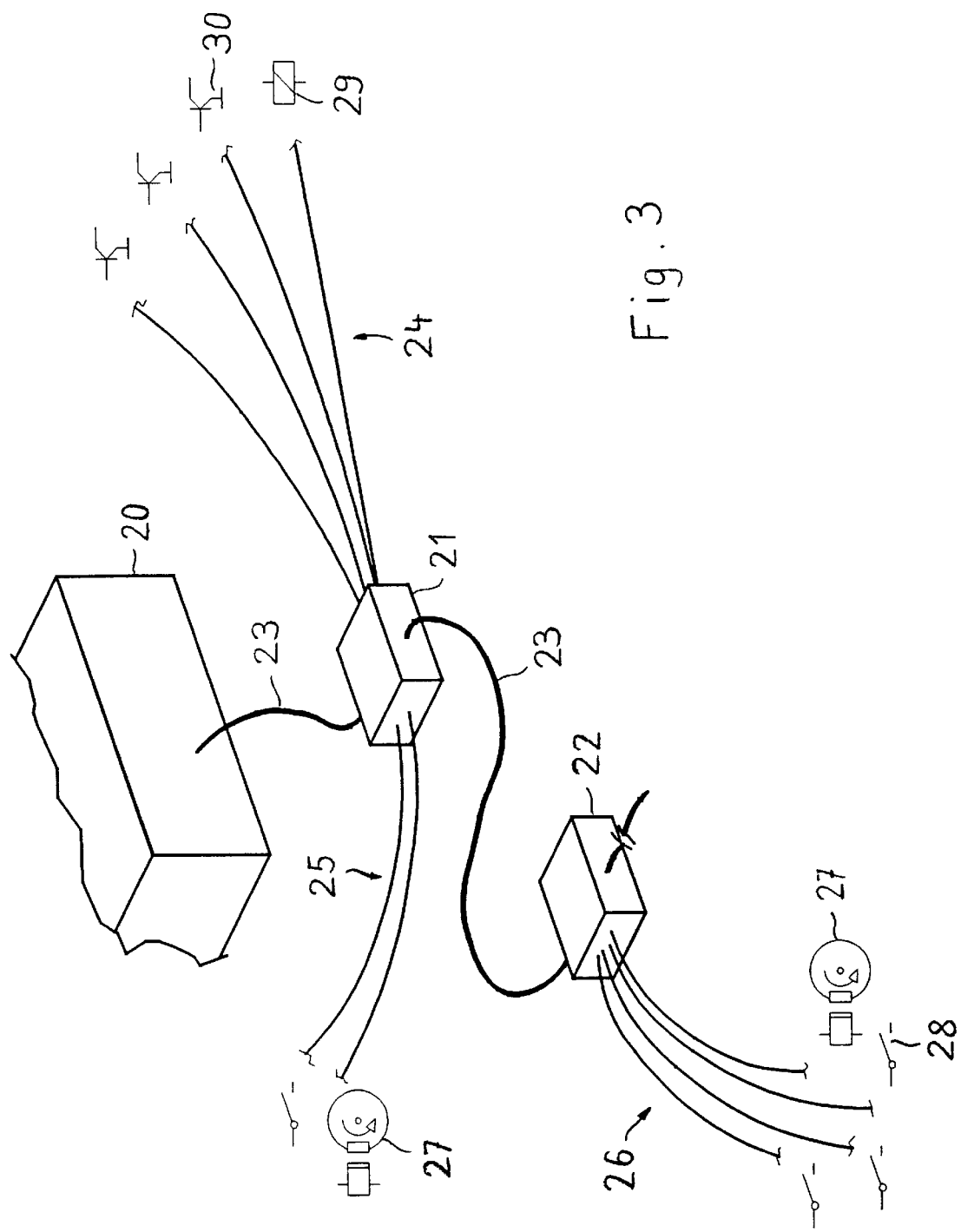
FIGS. 3 and 4 show two embodiments of the device in simplified form.

FIG. 3 shows a simplified illustration of a device according to the invention, that is to say a bus system, having a central unit 20 and functional units 21 and 22, which are connected via the bus 23. Sensors 27 and actuators 28, 29, 30, which are designed as switches, for example, here, are connected to the functional units 21 and 22 via lines 24, 25 and 26.

Figure 4:
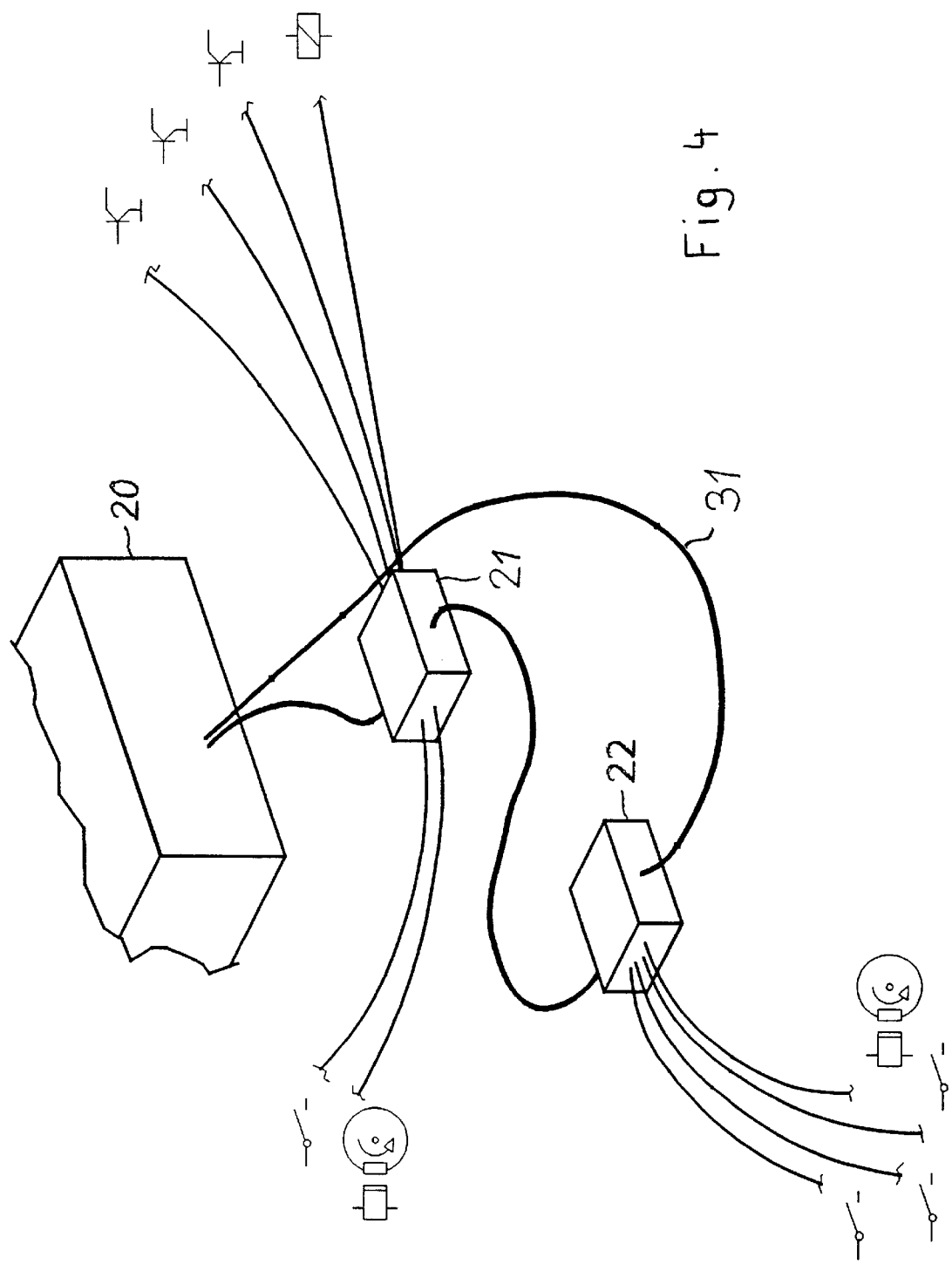

FIG. 4 shows, in a similar manner to FIG. 3, the device having a central unit 20 and functional units 21, 22 which, however, are in this case connected to one another via a closed or annular bus 31.

In order to describe the method of operation of the device, it is necessary to distinguish between three types of operation, which are described in the following text: initialization, normal operation and broadcast operation.

The functional units 2 and 3 are initially inactive after the electrical power supply is connected and as soon as current is flowing in the lines 4 and 5. This means that, although they pass data on via the line 6 to the next functional unit they cannot, however, emit data themselves to the bus or the line 7. For this purpose, the line 6 is connected to the processor 10 only via the line 15a.

In the first operating mode, the initialization or the outputting of addresses can take place from this condition described above. This is done by an instruction being emitted via the lines 6 and 15a to the processor 10, which instruction results in the output amplifier 11, and thus the data output, being switched off. The central unit 1 can thus now communicate only with the functional unit 2. The central unit 1 can now set the address in the processor 10, for example, from "zero" to another value, for example "one", via the lines 6 and 15a. In this way, the functional unit 2 is addressed and the processor 10 ensures that the output amplifier 11 is activated again.

Once the functional unit 2 has now been addressed, the central unit 1 can now also communicate with the functional unit 3. If the central unit 1 now emits a further address, for example having the value "two", the functional unit 3 is thus addressed. If the central unit emits the address "two" once more, then a further functional unit is also provided with the same address.

Every functional unit can be addressed in accordance with this method. Functional units which are in the addressing phase emit an acknowledgement to the central unit. In this way, it is possible to confirm how many functional units are present, or how many functional units can still be activated or are just capable of operation since the functional unit can also react to data as soon as it is addressed. If it does not react, then it is defective or if the central unit has emitted one address too many, it never receives an acknowledgement from the relevant functional unit.

In the second operating mode, normal operation, the individual functional units can respond individually via their addresses. Once a functional unit has received its address, then it remains active until another functional unit is called up by its address. If a plurality of functional units or subscribers have received the same address, then a plurality of functional units, and thus a plurality of sensors or actuators, can thus respond simultaneously. However, in such a case, the central unit 1 still receives acknowledgements only from the functional unit which has the same address and is also located closest to the central unit 1. The difference between the functional unit which has just been addressed by its address and the other functional units is that, in the case of the addressed functional unit, the line 15b is activated by the processor 10. In addition, in the case of the downstream functional unit, the input filters 14 and the output amplifiers 12 are also inactive.

In the third operating mode, broadcast operation, in which general transmission takes place to all the functional units, all the functional units are active but only the input filters 13 and the output amplifiers 11 among them are activated by the processor 10. This means that, although the functional units 2, 3 can receive data, they cannot emit data, however. In this way, specific tests, for example, can be carried out. For example, actuators which are connected to the functional units can be moved to a specific position, from which their functionality can be identified.

Since the supply to the sensors and actuators is provided separately via lines 4, 5, they remain functional in all three operating modes.

We claim:

1. A system for transmission of data comprising;

a central unit; and at least one functional unit connected to said central unit via at least two data lines and at least one separate power line, each functional unit being connected to at least one sensor or actuator;

each functional unit further comprising:

means for the transmission of data to another functional unit; and means for the storage of a changeable address.

2. A device according to claim 1, wherein each functional unit has a first line for the transmission of data in a first direction, a second line for transmission of data in a second direction and a processor which is connected to the first and second lines.

3. A device according to claim 2, wherein each functional unit includes one input filter and one output filter that are connected in series in the first line and in the second line, respectively.

4. A method for the transmission of data between a central unit and a plurality of functional units comprising the steps of:

emitting the data from the central unit to at least one functional unit;

assigning an address to each of the functional units from the central unit in a first mode of operation;

interchanging data between the central unit and the functional units via the addresses in a second mode of operation; and said functional units receiving data from the central unit jointly and without the use of addresses in a third mode of operation.

5. The method according to claim 4 comprising;

storing the address in a processor of each of said functional units in said first mode of operation, wherein said address can be assigned to one or more of said functional units.

6. The method according to claim 4, wherein said functional units can only receive data in said third mode of operation.

7. The method according to claim 4 comprising, retaining functional capability of sensors and actuators connected to said functional units in said first, second and third modes of operation.

* * * * *